United States Patent
Goodwin

(10) Patent No.: US 7,044,170 B2
(45) Date of Patent: May 16, 2006

(54) HYDRAULIC CEMENTITIOUS COMPOSITION WITH IMPROVED BLEEDING RESISTANCE

(75) Inventor: Frederick R. Goodwin, Solon, OH (US)

(73) Assignee: Construction Research & Technology GmbH, Trostberg (DE)

( * ) Notice: Subject to any disclaimer, the term of this patent is extended or adjusted under 35 U.S.C. 154(b) by 329 days.

(21) Appl. No.: 10/626,971

(22) Filed: Jul. 25, 2003

(65) Prior Publication Data
US 2004/0127606 A1    Jul. 1, 2004

Related U.S. Application Data

(60) Provisional application No. 60/403,482, filed on Aug. 14, 2002.

(51) Int. Cl.
*F16L 9/147* (2006.01)

(52) U.S. Cl. .............. 138/176; 52/742.14; 52/742.16; 52/223.1; 427/219; 427/403; 428/378; 428/404

(58) Field of Classification Search .......... 52/742.14, 52/742.16, 223.1; 138/176; 427/219, 403; 428/378, 404
See application file for complete search history.

(56) References Cited

U.S. PATENT DOCUMENTS

| | | |
|---|---|---|
| 3,929,741 A | 12/1975 | Lasky |
| 3,931,096 A | 1/1976 | Guilbault et al. |
| 3,936,408 A | 2/1976 | Adams et al. |
| 3,943,996 A | 3/1976 | Guilbault et al. |
| 3,994,852 A | 11/1976 | Adams et al. |
| 4,011,909 A | 3/1977 | Adams et al. |
| 4,015,991 A | 4/1977 | Persinski et al. |
| 4,021,257 A | 5/1977 | Bernett |
| 4,309,523 A | 1/1982 | Engelhardt et al. |
| 4,404,111 A | 9/1983 | Bi et al. |
| 4,730,028 A | 3/1988 | Bock et al. |
| 4,915,845 A | 4/1990 | Leighton et al. |
| 4,935,060 A | 6/1990 | Dingsoyr |
| 5,181,568 A | 1/1993 | McKown et al. |
| 5,229,019 A | 7/1993 | Forrest |
| 5,284,513 A | 2/1994 | Cowan et al. |
| 5,476,885 A | 12/1995 | Tahara et al. |
| 5,510,436 A | 4/1996 | Hille et al. |
| 5,512,096 A | 4/1996 | Krause |
| 5,854,318 A | 12/1998 | Tahara et al. |
| 5,871,668 A * | 2/1999 | Heimann et al. ...... 252/389.62 |
| 6,117,960 A | 9/2000 | Kohlhammer et al. |
| 6,166,119 A | 12/2000 | Matsuo et al. |
| 6,277,900 B1 | 8/2001 | Oswald et al. |
| 6,316,568 B1 | 11/2001 | Kohlammer et al. |
| 6,441,082 B1 | 8/2002 | Weitzel et al. |
| 2003/0170306 A1 | 9/2003 | Raether et al. |

FOREIGN PATENT DOCUMENTS

JP    10-053627    2/1998

OTHER PUBLICATIONS

Toyoharu, et al., Highly Fluid Concrete Composition and Separation Reducing Agent and Copolymer for the Same Composition; JP-10053627 (Feb. 24, 1998)—Abstract.

\* cited by examiner

*Primary Examiner*—Peter Szekely
(74) *Attorney, Agent, or Firm*—Curatolo Sidoti Co.

(57) ABSTRACT

A method of making a grout composition which reduces the amount of bleed water from grout used in bonded post-tensioned concrete applications is provided. The method includes forming the grout composition by combining copolymers with other materials into a hydraulic cementitious composition. The copolymers are formed from structural components a) to c) and optionally d) which are mono-unsaturated compounds, with a generally linear macromolecular structure. By reducing the amount of bleed water in bonded post-tensioned concrete applications the grout composition provides protection from corrosion for the steel members, including stranded tendons and solid bars. The reduction in the amount of bleed water is achieved without significantly increasing the viscosity of the grout mixture thereby allowing good pumpability, placement, and maintenance of other properties such as resistance to volume change, long working time and acceptable strength development.

66 Claims, 1 Drawing Sheet

HYDRAULIC CEMENTITIOUS COMPOSITION WITH IMPROVED BLEEDING RESISTANCE

BACKGROUND OF THE INVENTION

Post-tensioned concrete involves the application of tension to a steel cable strand cast in hardened concrete, followed by anchoring the stretched steel cable strand at the member ends, which produces compressive stress in concrete. This acts to improve the response of a concrete member or structure to loading and reduces deflections and cracking while allowing longer clear spans, thinner slabs, and lighter structures.

Concrete by itself is very strong in compression, but weak in tension, while steel is very strong in tension. To compensate for concrete's natural weakness in tension, post-tensioned concrete imposes a permanent compression load on the structural members. With this type of concrete system, high-strength steel cable strands, often in combination with reinforcing steel bars, are embedded and anchored in concrete. When the concrete has acquired adequate strength, usually three or four days after placement, the tendons are tensioned, (stretched like rubber bands) thereby imposing a compression force on the concrete. These tendons remain stressed throughout the life of the structure, to counterbalance future tension loads.

However, the post-tensioned steel cable strands and bars embedded within the concrete are subject to an increased risk of corrosion caused by the composition of the steel, the stress imposed on the steel, and the ingress of deleterious materials. One method of providing corrosion protection to the steel in the tendons is known as bonded post-tensioning which consists of injecting a hydraulic cementitious grout into the annular space between the duct and the steel in the tendon. If the grout fails to completely encapsulate the steel, whether by incomplete filling of the duct during the grouting operation, entrapment of air in the duct, settlement, or bleeding of the grout after installation, the potential for corrosion to occur in the tendon is increased.

The water in bleed water pockets may evaporate, be reabsorbed by the hydrating hydraulic cementitious grout, or leak from the duct; all resulting in a void being produced next to the steel that allows for corrosion to initiate. The relative anode to cathode area of the corrosion cell, as well as the other factors previously mentioned, have been found to produce rapid corrosion creating structural concerns with numerous structures. Bleed water that does not escape from the bleed water pocket may also freeze and cause rupture of the duct and surrounding concrete. The Post-Tensioning Institute (PTI) defines bleeding in their "Specification for Grouting of Post-Tensioned Structures" as, "The autogeneous flow of mixing water within, or its emergence from, newly placed grout; caused by the settlement of the solid materials within the mass and the filtering action of strands, wires, and bars". Bleeding is also defined in ASTM C125 as "the autogeneous flow of mixing water within, or its emergence from, newly placed concrete or mortar caused by the settlement of the solid materials within the mass, also called water gain".

Bleeding is one of the causes of unstable volume and is problematic in non-shrink and post-tensioned grouts. Research has demonstrated that bleeding of grout in ducts for post-tensioning is largely influenced by the interstices formed in the strand by the space between the king wire and the perimeter wires that act as a capillary tube. Gravity causes a pressure head, formed by the difference in elevation between the crown and the trough of the duct profile or the height difference in the lift of the vertical ducts. Temperature, rheology and fluidity play an important factor in bleeding of the combined system.

When the stretched steel cable strands corrode they can break, causing the concrete structure to weaken. As the steel cable strands are not visible or readily accessible, it is very difficult to determine if the steel is corroded and, if so, to what extent. One of the most common techniques to determine if there is a corrosion problem is by observation of cracking in the structure itself, or by drilling into the structure. The act of penetration into the duct to inspect for voids is also likely to lead to the ingress of deleterious materials such as chlorides, oxygen, and carbon dioxide which will then initiate the corrosion process, if the penetration is not permanently resealed. As the steel cable strand is corroded away, the stress on the remaining tendons increases and can lead to structural failure. Repair of failed tendons is very expensive even if structural failure is prevented.

U.S. Pat. No. 5,181,568 to McKown, et al. discloses a method of reducing the water permeability of a subterranean oil bearing formation by a method comprising the steps of: (a) introducing a viscous aqueous pre-polymer composition (polyacrylamide) into the formation which will subsequently form a crosslinked gel therein, and (b) thereafter introducing a hydrocarbon hydraulic cement slurry (hydraulic cement portland, pozzolan, silica slag, or mixtures thereof) into the formation.

U.S. Pat. No. 5,284,513 to Cowan, et al. discloses a hydraulic cement slurry composition comprising: (a) blast furnace slag, (b) a drilling fluid comprising an aqueous phase, clay and salt. The drilling fluid is present in the slurry in an amount sufficient to provide an amount of clay effective to act as a fluid loss control agent. The hydraulic cement slurry also includes an acid functionalized prepolymer (polyacrylamide) and a crosslinker.

U.S. Pat. No. 5,512,096 to Krause discloses a grouting composition for sealing boreholes or other cavities comprising 90.0–99.99% water swellable clay and 0.01–10.0% gelling agent (polyacrylamide). The grouting composition is mixed with fresh water to provide a low permeability sealing composition.

U.S. Pat. No. 4,015,991 to Persinski, et al. discloses hydraulic cementing compositions and their use in cementing operations which are capable of forming a slurry and which comprise a) dry hydraulic cement; and b) copolymers of hydrolyzed acrylamide and 2-acrylamido-2methylpropane sulfonic acid derivatives, which are used as fluid loss additives for the installation of aqueous hydraulic cement slurries used for cementing wells in subterranean formations.

Examples of copolymer bleeding resistant additives can be found in U.S. Pat. Nos. 3,768,565, 4,015,991, 4,515,635, 4,554,081, and published U.S. application Ser. No. 20010029287, which are all incorporated herein by reference as if written out in full below.

What is needed in the industry is a post-tensioned hydraulic cementitious grout mixture that is resistant to bleeding in order to protect steel cable strands and bars from corrosion caused by water bled out of the mixture, but which has a sufficiently low viscosity to allow for pumpability and ease of placement.

SUMMARY OF THE INVENTION

A method of making a hydraulic cementitious grout composition with superior bleeding resistance and placement characteristics is provided wherein the method comprises combining copolymers with other materials into a hydraulic cementitious composition. The composition provides protection from corrosion for the steel members, including stranded tendons, cables and solid bars, that are utilized in post-tensioned concrete, by substantially suppressing the formation of bleed water pockets due to capillary wick induced bleeding and settlement of the hydraulic cementitious composition.

In one embodiment is provided a method of making a reduced fluid loss post-tensioned hydraulic cementitious grout article which comprises; inserting at least one bar member into a channel; securing a first end of the bar member; stretching the bar member; securing a second end of the bar member; introducing into the channel a reduced fluid loss hydraulic cementitious grout composition comprising hydraulic cement, water, and a copolymer, wherein the copolymer comprises at least two components selected from a), b) and c):

wherein a) is the component $$-CH_2-CR^1-$$
$$|$$
$$CO$$
$$|$$
$$V$$
$$|$$
$$(CR^2R^3)_n$$
$$|$$
$$CH-R^4$$
$$|$$
$$SO_3^-Me$$
(Formula I)

wherein
- $R^1$ = is at least one of hydrogen or methyl;
- $R^2$, $R^3$, $R^4$ = are each independently hydrogen, aliphatic hydrocarbon radical with 1 to about 6 carbon atoms, or phenyl radical;
- V = NH or oxygen;
- M = hydrogen, monovalent metal cation, bivalent metal cation, ammonium, or an organic amino radical;
- n = about 1 to about 5;
- e = 0.5 or 1;

b) is at least one component selected from the group consisting of $$-CH_2-CR^1-$$
$$|$$
$$W$$
$$|$$
$$NR^5R^6$$
(Formula II)

$$-CH_2-CR^1-$$
$$|$$
$$N-CO-R^6 \quad \text{and}$$
$$|$$
$$Q$$
(Formula III)

$$-CH_2-CR^1-$$
$$|$$
$$COOR^5$$
(Formula IV)

wherein
- W = —CO—, —CO—$(CH_2)_x$—, —CO—$NR^2$—$(CH_2)_x$—;
- $R^1$ = is at least one of hydrogen or methyl;
- $R^2$ = hydrogen, aliphatic hydrocarbon radical with 1 to about 6 carbon-atoms, or phenyl radical;
- x = about 1 to about 6;
- $R^5$ and $R^6$ = are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;
- Q = hydrogen or —$CHR^5R^7$;
- $R^7$ = hydrogen, aliphatic hydrocarbon radical containing 1 to about 4 carbon atoms, —COOH or —$COOM_a$;
- M = hydrogen, monovalent metal cation, bivalent metal cation, ammonium, or an organic amino radical;
- a = 0.5 or 1;

c) is at least one component selected from the group consisting of $$-CH_2-CR^1-$$
$$|$$
$$CO$$
$$|$$
$$Y$$
$$|$$
$$V$$
$$|$$
$$R^5-N^+-R^6 \quad (X^-)$$
$$|$$
$$R^8$$
(Formula V)

and $$-CH_2-CH-CH-CH_2-$$
$$\quad\; CH_2 \quad\quad CH_2 \quad (X^-)$$
$$\quad\quad\; \searrow \!\!\!\!\! _+ \!\!\!\!\! \swarrow$$
$$\quad\quad\quad\; N$$
$$\quad\quad\; R^2 \;\; R^3$$
(Formula VI)

wherein
- $R^1$ = is at least one of hydrogen or methyl;
- $R^2$ and $R^3$ = are each independently hydrogen, aliphatic hydrocarbon radical with 1 to about 6 carbon-atoms, or phenyl radical;
- $R^5$ and $R^6$ = are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;
- $R^8 = R^5$ or $R^6$, —$(CH_2)_x$—$SO_3^\ominus(M)$, $$-\!\!\!\bigcirc\!\!\!-SO_3^\ominus, \quad -\!\!\!\bigcirc\!\!\!-SO_3^\ominus;$$

- Y = O, NH or $NR^5$;
- V = —$(CH_2)_x$—,

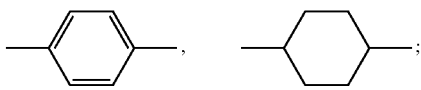

X=halogen, $C_1$- to $C_4$-alkylsulfate or $C_1$- to $C_4$-alkylsulfonate; and

M=hydrogen, monovalent metal cation, bivalent metal cation, ammonium, or an organic amino radical.

Further provided is a method of making a reduced fluid loss post-tensioned hydraulic cementitious grout article which comprises; inserting at least one bar member into a channel; securing a first end of the bar member; stretching the bar member; securing a second end of the bar member; introducing into the channel a reduced fluid loss hydraulic cementitious grout composition comprising hydraulic cement, water, and a copolymer, wherein the copolymer comprises at least two components selected from a), b) and c):

wherein a) is the component

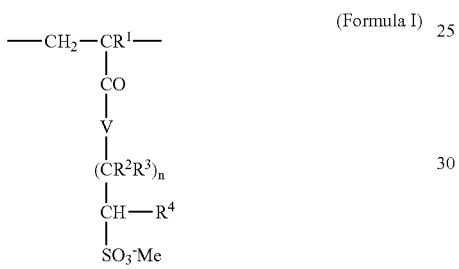
(Formula I)

wherein $R^1$=is at least one of hydrogen or methyl;

$R^2$, $R^3$, $R^4$=are each independently hydrogen, aliphatic hydrocarbon radical with 1 to about 6 carbon atoms, or phenyl radical;

V=NH or oxygen;

M=hydrogen, monovalent metal cation, bivalent metal cation, ammonium, or an organic amino radical;

n=about 1 to about 5;

e=0.5 or 1;

b) is the component

(Formula II)

wherein

W=—CO—, —CO—$(CH_2)_x$—, —CO—$NR^2$—$(CH_2)_x$—;

$R^1$=is at least one of hydrogen or methyl;

$R^2$=hydrogen, aliphatic hydrocarbon radical with 1 to about 6 carbon-atoms, or phenyl radical;

x=about 1 to about 6;

$R^5$ and $R^6$=are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;

c) is the component

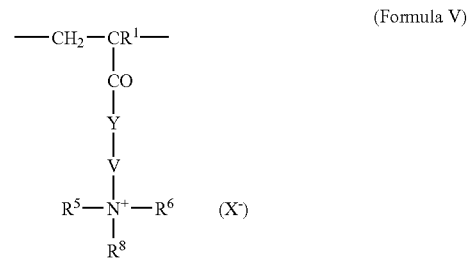
(Formula V)

wherein $R^1$=is at least one of hydrogen or methyl;

$R^5$ and $R^6$=are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;

$R^8$=$R^5$ or $R^6$, —$(CH_2)_x$—$SO_3^\ominus$(M),

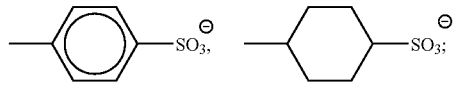

Y=O, NH or $NR^5$;

V=—$(CH_2)_x$—,

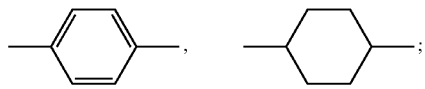

x=halogen, $C_1$- to $C_4$-alkylsulfate or $C_1$- to $C_4$-alkylsulfonate; and

M=hydrogen, monovalent metal cation, bivalent metal cation, ammonium, or an organic amino radical.

A reduced fluid loss post-tensioned hydraulic cementitious grout article is also provided, which is prepared from the reduced fluid loss hydraulic cementitious grout composition.

In certain embodiments the sulfonic acid of formula I is replaced with at least one of a methallylsulfonic acid or allyl sulfonic acid monomeric derivative.

DETAILED DESCRIPTION OF THE INVENTION

Figure 1:
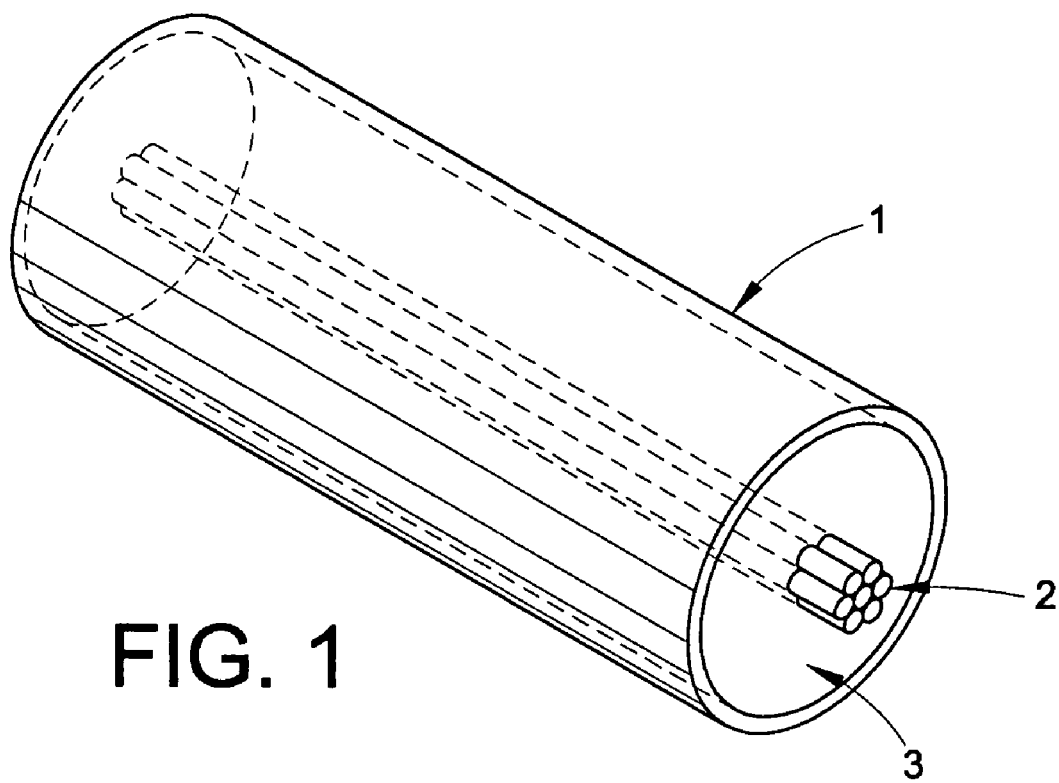
FIG. 1 is a schematic exploded view of a post-tensioned article comprising reduced fluid loss hydraulic cementitious grout, a channel and bar members.
Figure 1A:
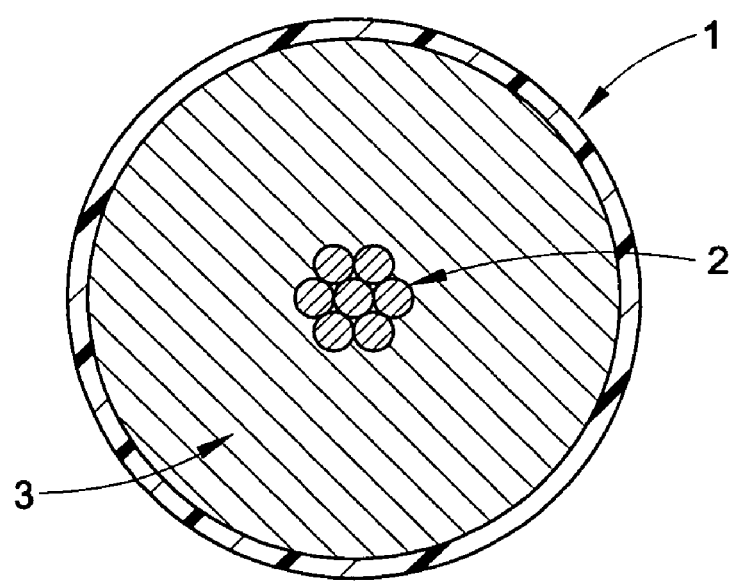
FIG. 1A is a cross-sectional view of a post-tensioned article comprising reduced fluid loss hydraulic cementitious grout, a channel and bar members.

A method of making a bleeding resistant hydraulic cementitious composition with improved pumpability is provided. By selecting ingredients, such as copolymers, preferably polyacrylamide copolymers, a balance of fluidity and pumpability is achieved in a grout composition with enhanced bleeding resistance, and maintenance of other properties such as controlled volume change (plastic and hardened), long working time, acceptable strength development, and corrosion protection for imbedded ferrous materials. Additional cementitious composition components may include, but are not limited to, shrinkage compensation agents, dispersants such as superplasticizers, expansive agents, corrosion inhibitors, setting control agents (retarders or accelerators), air entrainment agents, defoaming agents, aggregates, viscosity control agents, pozzolans, and the like. The dosage levels for each of the above components can be controlled to obtain desired properties of the hydraulic cementitious composition.

The cementitious composition reduces the amount of bleed water coming into contact with the steel tensioning rods and bars in post-tensioned grout applications. Grout is defined in ASTM C125 as "a cementitious mixture, with or without admixtures, that is used primarily to fill voids". Non-shrink grout is defined by ASTM in C125 as "a hydraulic cement grout that produces a volume that, when hardened under stipulated test conditions, is greater than or equal to the original installed volume, often used as a transfer medium between load-bearing members". By reducing the amount of water bleeding out of the hydraulic cementitious mixture, the risk of corrosion to the steel member is decreased, which provides the concrete structure with a constant strength over time. This can be achieved by incorporation of the copolymers as discussed herein, without increasing the viscosity of the mixture, thereby allowing good pumpability, placement and maintenance of other properties such as decreased volume change, long working time and acceptable strength development.

Articles formed from the reduced fluid loss hydraulic cementitious grout composition can include but are not limited to post-tensioned tendons comprising a duct 1, bar members which by way of example may be bars, rods, strands and/or cables 2 and reduced fluid loss hydraulic cementitious grout 3. The duct 1 encases the reduced fluid loss hydraulic cementitious grout 3 and bar members 2, while the reduced fluid loss hydraulic cementitious grout 3 envelopes the bar members 2 which span substantially the entire length of the channel 1.

The copolymeric bleeding resistant additives of the present invention comprise a copolymer comprising at least two types of constitutional repeating units or components selected from a) (formula I), b) (formulas II, III, IV), c) (formulas V and VI), and optionally d).

The a) component is a substituted acrylic or methacrylic derivative which contains a sulfonic group and has the representative formula I:

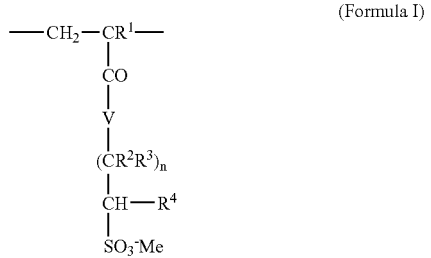
(Formula I)

wherein
$R^1$=is at least one of hydrogen or methyl;
$R^2$, $R^3$, $R^4$=are each independently hydrogen, aliphatic hydrocarbon radical with 1 to about 6 carbon-atoms, or phenyl radical;
V=NH or oxygen;
M=hydrogen, monovalent metal cation, bivalent metal cation, ammonium, or an organic amino radical;
n=about 1 to about 5; and
e=0.5 or 1.

The monovalent or bivalent metal cation can be sodium, potassium, lithium, calcium and/or magnesium cations. Organic amino radicals can be substituted ammonium groups, which are derived from primary, secondary or tertiary $C_1$–$C_{20}$ alkylamines, $C_1$–$C_{20}$ alkanolamines, $C_5$–$C_8$ cycloalkylamines and $C_6$–$C_{14}$ arylamines. Examples of such amines include but are not limited to methylamine, dimethylamine, trimethylamine, ethanolamine, diethanolamine, triethanolamine, cyclohexylamine, dicyclohexylamine, phenylamine and diphenylamine in the protonated ammonium form.

The component a) may be derived from monomers such as 2-acrylamido-2-methylpropane sulfonic acid, 2-methacrylamido-2-methylpropane sulfonic acid, 2-acrylamidobutane sulfonic acid, 3-acrylamido-3-methylbutane sulfonic acid, and 2-acrylamido-2,4,4-trimethylpentane sulfonic acid. In certain embodiments, the monomer used to prepare structural component a) is 2-acrylamido-2-methylpropane sulfonic acid.

The aliphatic hydrocarbon, organic amino or phenyl radicals include but are not limited to those radicals that contain one or more substituents, such as hydroxyl groups, alkyl groups containing 1 to about 6 carbon atoms, carboxyl groups and/or sulfonic groups.

The b) component is represented by formula II and/or formula III and/or formula IV

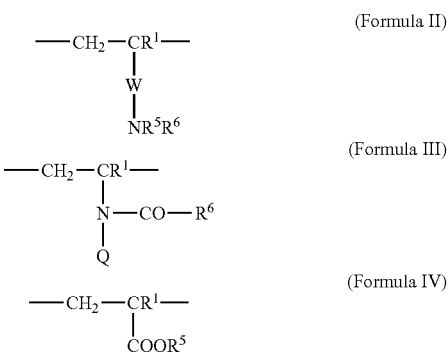

wherein
W=—CO—, —CO—$(CH_2)_x$—, —CO—$NR^2$—$(CH_2)_x$—;
$R^1$=is at least one of hydrogen or methyl;
$R^2$=hydrogen, aliphatic hydrocarbon radical with 1 to about 6 carbon-atoms, or phenyl radical;
x=about 1 to about 6;
$R^5$ and $R^6$=are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, aryl radical containing about 6 to about 14 carbon atoms;

Q=hydrogen or —CHR$^5$R$^7$;

R$^7$=hydrogen, aliphatic hydrocarbon radical containing 1 to about 4 carbon atoms, —COOH or —COOM$_a$;

M=hydrogen, monovalent metal cation, bivalent metal cation, ammonium, or an organic amino radical; and, a=0.5 or 1.

The aliphatic hydrocarbon, alicyclic hydrocarbon, aryl, organic amino or phenyl radicals include but are not limited to those radicals that contain one or more substituents, such as hydroxyl groups, alkyl groups containing 1 to 6 carbon atoms, carboxyl groups and/or sulfonic groups.

Monomers preferred for forming the component of formulas II, III, and IV are: acrylamide, methacrylamide, N-methylacrylamide, N,N-dimethyl acrylamide, N-ethyl acrylamide, N-cyclohexyl acrylamide, butyl acrylamide and the like. Examples of monomers from which the component of formula III may be derived or formed include N-methyl-N-vinyl formamide, N-methyl-N-vinyl acetamide, N-vinyl pyrrolidone, N-vinyl caprolactam and N-vinylpyrrolidone-5-carboxylic acid among others.

The c) component is represented by the formula V and/or VI:

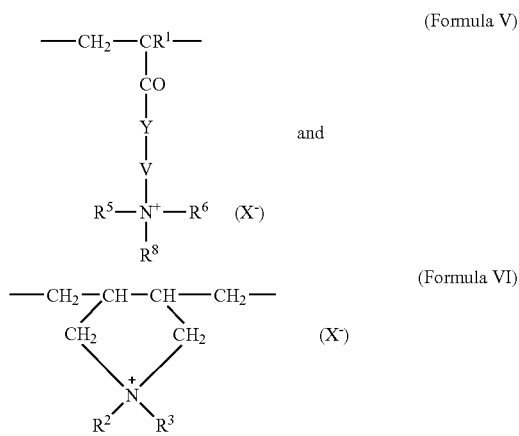

wherein

R$^1$=is at least one of hydrogen or methyl;

R$^2$ and R$^3$=are each independently hydrogen, aliphatic hydrocarbon radical with 1 to about 6 carbon-atoms, or phenyl radical;

R$^5$ and R$^6$=are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;

R$^8$=R$^5$ or R$^6$, —(CH$_2$)$_x$—SO$_3$$^\ominus$(M),

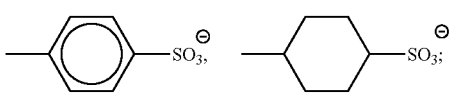

Y=O, NH or NR$^5$;

V=—(CH$_2$)$_x$—,

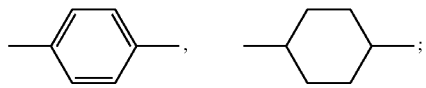

X=halogen, C$_1$- to C$_4$-alkylsulfate or C$_1$- to C$_4$-alkylsulfonate; and

M=hydrogen, monovalent metal cation, bivalent metal cation, ammonium, or an organic amino radical.

The radicals include but are not limited to those radicals that contain one or more substituents, such as hydroxyl groups, alkyl groups containing 1 to 6 carbon atoms, carboxyl groups and/or sulfonic groups.

Examples of monomers for forming the component of formulas V and VI include but are not limited to: [2-(acryloyloxy)-ethyl]-trimethyl ammoniumchloride, [2-(acryloylamino)ethyl]-trimethylammoniumchloride, [2-(acryloyloxy)-ethyl]-trimethyl ammonium methosulfate, [2-(methacryloyloxy)-ethyl]-trimethyl ammonium chloride or methosulfate and [3-(methacryloylamino)-propyl]-trimethyl ammonium chloride.

The monomers which form the structural components a) to c) are mono-unsaturated compounds, the macromolecular structure of which, generally, is linear. In some embodiments, however, the polymer chains are branched or cross-linked. To generate such structures, the copolymers of the invention can comprise from 0.0001 to 50 mole percent of a d) component, derived from one or more monomers with more than one double bond, namely from di- and tri-olefinic compounds, with a preferred proportion of about 0.001 to about 5 mole percent. Examples, of such compounds include but are not limited to diacrylate or dimethylacrylate esters of ethylene glycol, polypropylene glycol or block copolymers of ethylene and propylene glycol, diallyl or divinyl ethers of ethylene glycol or propylene glycol, 1,4-butanediol, 1,5-pentanediol, or 1,6-hexanediol. Also for example, N,N'-methylene-bis-acrylamide or N,N'-methylene-bis-methacrylamide as di-olefinic compounds, or trimethylolpropane, triacrylate or triallyl isocyanurate as tri-olefinic compounds, may be used.

In other embodiments the d) component can also be derived from mono-olefinic polymerizable compounds, for example, acrylic- or vinyl-based compounds, in a proportion of about 0.1 to about 30 mole percent. Examples of such compounds include but are not limited to: acrylonitrile, styrene, ethylene, butadiene, propylene, isobutene, vinyl acetate, acrylic acid, methacrylic acid, methyl acrylate, methyl methacrylate, ethyl acrylate, butyl acrylate, ethylhexyl acrylate, allyl acetate, maleic acid, maleic anhydride, diethyl maleate, dibutyl maleate, fumaric acid, itaconic acid, dodecenylsuccinic anhydride, vinylsulfonic acid, styrene sulfonic acid and mixtures thereof.

In one embodiment the copolymers contain about 3 to about 96 mole percent of component a), about 3 to about 96 mole percent of component b) and/or 0 to about 75 mole percent of component c), expressed in terms of the total monomer or repeating unit mole count. In another embodiment, the copolymers contain about 40 to about 80 mole percent component a), about 10 to about 55 mole percent component b) and/or about 2 to about 30 mole percent component c).

The number of repeating units in the copolymers of the invention is not limited and depends on the type of application in question. In one embodiment the number of repeating units is such that the copolymers have an average molecular weight of about 50,000 to about 20,000,000.

The copolymers are prepared through linkage of the monomers or repeating units which form components a) to c) and, in some embodiments, the d) component by means of free-radical, ionic, solution, gel, emulsion, dispersion or suspension polymerization. Since the copolymers of the invention are water-soluble or water-swellable compounds, in some embodiments polymerization is in the aqueous phase, in reverse emulsion or in inverse suspension. In other embodiments, the polymerization reaction is conducted as an aqueous solution or gel polymerization or as an inverse suspension polymerization in organic solvents, with the assistance of initiator radicals. If the polymerization is conducted in the aqueous phase, in some embodiments gel polymerization is utilized, especially for preparing copolymers in the upper molecular weight range.

In a further embodiment the bleeding resistant additive of the present invention can be a copolymer of monomers such as N,N, dimethylacrylamide and 2-acrylamido, 2-methyl propane sulfonic acid. The bleeding resistant copolymers of the invention can be present in an amount from about 0.001% to about 10.0% by weight based on the dry weight of the hydraulic cement.

Hydraulic cementitious compositions are materials that alone have hydraulic cementing properties, and set and harden in the presence of water. Included in cementitious materials are ground granulated blast-furnace slag, natural cement, portland cement, modified portland cement, masonry cement, hydraulic hydrated lime, and combinations of these and other materials. By portland cement is meant a hydraulic cement produced by pulverizing clinker, comprising hydraulic calcium silicates, calcium aluminates, and calcium aluminoferrites, and usually containing one or more of the forms of calcium sulfate as an interground addition, and includes portland cement, the specification for which is set forth in ASTM specification C 150, and cements that are chemically similar or analogous to portland cement, the specifications for which are set forth in ASTM specifications C 1157, C 595, and C 845. The hydraulic cementitious grout used in the present invention may include but is not limited to hydraulic cementitious grouts sold under the trademarks MASTERFLOW® (Degussa Construction Systems, Cleveland, Ohio), SIKAGROUT® (Sika, Stockholm, Sweden), and CHEM-CRETE® (Chem Crete Corporation, Richardson, Tex.).

The cementitious composition described herein may contain other additives or ingredients and should not be limited to the stated formulations. Cement additives that can be added include, but are not limited to: set accelerators, set retarders, air-entraining agents, defoamers, corrosion inhibitors, strength enhancing agents, fibers, dampproofing admixtures, expansive agents, permeability reducers, pumping aids, fungicidal admixtures, germicidal admixtures, insecticidal admixtures, shrinkage reducing admixtures, aggregates, pozzolans, viscosifying agents, and any other admixture or additive that does not adversely affect the properties of the admixture of the present invention.

The set accelerator if used in the hydraulic cementitious composition of the present invention, can include, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (preferably bromide), and mixtures thereof. Examples of accelerators particularly suitable for use in the present invention include, but are not limited to, POZZOLITH® NC534 nonchloride type accelerator and/or RHEOCRETE® CNI calcium nitrite-based corrosion inhibitor, both sold by Master Builders Inc. of Cleveland, Ohio.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitrous acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_d CH_2OH]_e$, where c is 3-e, d is 1 to about 5 and e is 1 to about 3. Examples include, but are not limited to, monoethanoalamine, diethanolamine and triethanolamine.

The thiosulfate salts have the general formula $M_f(S_2O_3)_g$ where M is an alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The hydroxides have the general formula $M(OH)_a$ where M is an alkali metal, or an alkaline earth metal or aluminum, and where a is 1 for alkali metals, 2 for alkaline earth metals, and 3 for aluminum.

The carboxylic acid salts have the general formula RCOOM wherein R is H or $C_1$ to about $C_{10}$ alkyl, and M is an alkali metal or an alkaline earth metal or aluminum. Preferred are carboxylic acid salts of Na, K, Mg, Ca and Al. A preferred carboxylic acid salt is calcium formate.

One polyhydroxylalkylamine has the general formula

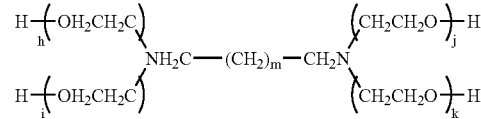

wherein h is 1 to 3, i is 1 to 3, j is 1 to 3, k is 0 to 3, and m is 0 to 6. Preferred is tetrahydroxyethylethylenediamine.

A set retarder if used in the hydraulic cementitious composition can include, but is not limited to oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof. Illustrative examples of retarders are set forth in U.S. Pat. Nos. 5,427, 617 and 5,203,919, incorporated herein by reference. A further example of a retarder particularly suited for use in the present invention is a hydration control admixture sold under the trademark DELVO® by Master Builders Inc. of Cleveland, Ohio.

Retarding, or delayed-setting, admixtures are used to retard, delay, or slow the rate of setting of concrete. They can be added to the hydraulic cementitious composition upon initial batching or sometime after the hydration process has begun. Retarders are commonly used to offset the accelerating effect of hot weather on the setting of concrete, to delay the initial set of concrete or grout when difficult conditions of placement occur or problems of delivery to the job site, to allow time for special finishing processes or to aid in the reclamation of concrete left over at the end of the work day. Most retarders also act as water reducers and can also be used to entrain some air into concrete.

Defoamers if present are used to decrease the air content in the cementitious composition. Examples of defoamers that can be utilized include, but are not limited to tributyl phosphate, dibutyl phthalate, octyl alcohol, water-insoluble esters of carbonic and boric acid, acetylenic diols, ethylene oxide-propylene oxide block copolymers, lignosulfonates, hydroxylated carboxylic acids, lignin, borax, gluconic, tartaric and other organic acids and their corresponding salts, phosphonates, petroleum oil mixtures, certain carbohydrates and silicones.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be any known air entraining agents for cement, including natural resins; synthetic resins; salts of wood resins; (Vinsol resin); anionic surfactants, cationic surfactants, nonionic surfactants, natural rosin, synthetic rosin, an inorganic air entraining agent, some synthetic detergents; salts of sulfonated lignin; salts of petroleum acids; salts of proteinaceous material; fatty and resinous acids and their salts; alkylbenzene sulfonates; and salts of sulfonated hydrocarbons. Air entrainers are added in an amount to yield a desired level of air in a cementitious composition. Generally, the amount of air entrainers in a cementitious composition ranges from about 0.2 to about 5.0 fluid ounces per hundred pounds of cement. But this can vary widely due to variations in materials, mix proportion, temperature, and mixing action.

A dispersant if used in the cementitious composition can be any suitable dispersant such as calcium lignosulfonates, beta naphthalene sulfonates, sulfonated melamine formaldehyde condensates, polyaspartates, or sodium naphthalene sulfate formaldehyde condensate resins for example LOMAR D® (Cognis Inc., Cincinnati, Ohio). Additionally, polycarboxylate dispersants can be used, by which is meant a dispersant having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cementitious compositions. Examples of polycarboxylate dispersants can be found in U.S. Pat. Nos. 6,267,814, 6,290,770, 6,310,143, 6,187,841, 5,158,996, 6,008,275, 6,136,950, 6,284,867, 5,609,681, 5,494,516; 5,674,929, 5,660,626, 5,668,195, 5,661,206, 5,358,566, 5,162,402, 5,798,425, 5,612,396, 6,063,184, and 5,912,284, 5,840,114, 5,753,744, 5,728,207, 5,725,657, 5,703,174, 5,665,158, 5,643,978, 5,633,298, 5,583,183, and 5,393,343, which are incorporated herein by reference.

Corrosion inhibitors in hydraulic cementitious compositions serve to protect embedded reinforcing steel from corrosion. The highly alkaline nature of the hydraulic cementitious composition causes a passive and noncorroding protective oxide film to form on the steel. However, carbonation or a sufficient concentration of chloride ions from deicers or seawater, together with oxygen can destroy or penetrate the film and result in corrosion. Corrosion-inhibiting admixtures chemically slow this corrosion reaction. The materials most commonly used to inhibit corrosion include but are not limited to calcium nitrite, sodium nitrite, sodium benzoate, certain phosphates or fluorosilicates, fluoroaluminates, amines, organic based water repelling agents, and related chemicals.

In the construction field, many methods of protecting hydraulic cementitious compositions from tensile stresses and subsequent cracking have been developed through the years. One modern strength enhancing method involves distributing fibers throughout a fresh concrete mixture. Upon hardening, this concrete is referred to as fiber-reinforced concrete. Fibers can be made of zirconium materials, carbon, steel, fiberglass, or synthetic materials, e.g., polypropylene, nylon, polyethylene, polyester, rayon, high-strength aramid, or mixtures thereof.

Dampproofing admixtures reduce the permeability of hydraulic cementitious compositions that have low cement contents, high water-cement ratios, or a deficiency of fines in the aggregate portion. These admixtures retard moisture penetration into dry concrete and include certain soaps, stearates, waxes, and petroleum products.

Expansive agents are sometimes added to hydraulic cementitious compositions to cause a slight expansion prior to hardening. The amount of expansion is dependent upon the amount of gas-forming material used and the temperature of the fresh mixture. Aluminum powder, zinc powder, magnesium powder, ammonium compounds, hydrazine salts, peroxides, perborates, fluidized coke, resin soap and vegetable or animal glue, saponin or hydrolyzed protein can be used as gas formers.

Permeability reducers are used to reduce the rate at which water under pressure is transmitted through hydraulic cementitious compositions. Silica fume, fly ash, ground slag, metakaolin, natural pozzolans, water reducers, and latex can be employed to decrease the permeability of the concrete.

Pumping aids are added to hydraulic cementitious composition mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened hydraulic cementitious composition may be partially controlled through the use of fungicidal, germicidal, and insecticidal admixtures. The most effective materials for these purposes are polyhalogenated phenols, dialdrin emulsions, and copper compounds.

The shrinkage reducing admixture that can be used in the present invention can include but is not limited to $RO(C_2H_4O)_{1-5}H$;
$RO(C_3H_6O)_{1-5}H$;
$RO(AO)_{1-10}H$; or
$R'OH$;

in which R represents a $C_{1-5}$ alkyl or $C_{5-6}$ cycloalkyl radical, and $-(AO)-_{1-10}$ is a polyoxyalkylene radical of 2–10 moles consisting of $C_2H_4O$ and $C_3H_6O$; alkali metal sulfates; alkaline earth metal sulfates; and alkaline earth oxides; and R' represents an alkyl group having about 4 to about 6 carbon atoms or a cycloalkyl group having about 5 to about 6 carbon atoms.

Aggregate can be included in the hydraulic cementitious composition to provide for concretes and mortars that include fine aggregate. The fine aggregates are materials that pass through a Number 4 (4.75-mm) sieve (ASTM C125 and ASTM C33), such as silica, quartz, crushed marble, glass spheres, granite, limestone, calcite, feldspar, alluvial sands, or any other durable aggregate, and mixtures thereof.

Pozzolans react with the hydration byproducts of the hydraulic cement, providing for increased strength of concrete, mortar or grout. Pozzolans, such as fly ash, reactive silicas, silica fume, calcined clay (such as metakaolin), or granulated ground blast furnace slag can be added to the hydraulic cementitious composition, as an addition to or replacement for the hydraulic cement, and together with the hydraulic cement can comprise the cementitious material of this composition.

A supplemental water retention agent that may be used in the hydraulic cementitious composition can be one or more selected from curdlan, sugar alcohol, xanthan gum, guar gum, polysaccharide gum, cellulose ether, starch ether, α-1,3-glucan, and mixtures thereof.

Another embodiment of the invention provides for a method of making of a reduced fluid loss post-tensioned hydraulic cementitious grout article, wherein the grout article includes but is not limited to post-tensioned tendons and cables. The method comprises placing a concrete member which can be in any form desirable in the construction industry such as walls, panels, or pillars that contains ducts and restraint points. The restraint points anchor the bar members in order that they may be tensioned (stretched). Bar members, which include but are not limited to bars, rods, strands and/or cables, preferably steel, are inserted into the ducts with one end of the bar member anchored to a restraint point. The anchored bar member is then tensioned (stretched) and anchored to a second restraint point. Covers are attached to the end of the ducts and reduced fluid loss post-tensioned hydraulic cementitious grout is introduced into the channel and allowed to set. Additionally, the terms used to describe post-tensioning should be given the meaning as one of ordinary skill in the field would understand them.

The typical water to cement ratio (W/C) of the reduced fluid loss hydraulic cementitious grout composition is no greater than about 0.45, preferably about 0.35 to about 0.44.

EXAMPLES

To test for bleeding resistance under pressure, post tensioned grout samples were prepared using a commercially available hydraulic cementitious grout, water, and optionally the copolymer. Samples 1 and 2 were prepared without the addition of the copolymer, resulting in the bleeding of water when the sample is exposed to pressure.

| Sample | Water (% by weight of formula) | German-Schupack Bleed Test (PSI) | Time (Minutes) | Water Extracted (Cubic Centimeters) | Cellulose | Copolymer (% by weight) |
|---|---|---|---|---|---|---|
| 1 | 31 | 80 | 10 | 9.5 | | |
| 2 | 28.8 | 45 | 10 | 7.4 | | |
| 3 | 31 | 80 | 10 | 0 | 0.4% | |
| 4 | 31 | 80 | 10 | 0 | | 0.4% |
| 5 | 28.8 | 45 | 10 | 1.0 | | 0.1% |
| 6 | 30 | 45 | 10 | 0 | | 0.4% |
| 7 | 30 | 100 | 5 | 0 | | 0.4% |
| 8 | 30 | 100 | 10 | 0 | | 0.4% |
| 9 | 30 | 100 | 20 | 0 | | 0.4% |

* Water Percentage based on weight of formulated mixture
* Psi = pounds per square inch
Tests
Post-tensioning Institute Guide Specification for Grouting of Post-Tensioned Structures Appendix C and Section 4.4.6.2 (German-Schupack Bleed Test)
Consistency per ASTM C827 for stiff plastic and flowable consistencies, ASTM C939 for fluid consistency, and PTI 4.4.5.2 for thixotropic flow.

In sample 2, the amount of water was reduced from 31% to 28% and pressure reduced from 80 (551.5 kilopascals) to 45 pounds per square inch (psi), (310.2 kilopascals), and there was still water loss at 7.4 cubic centimeters (cc's), (0.45 cubic inches). Addition of the cellulose bleeding resistance additive to sample 3 reduced the water loss, however the viscosity increased making it hard to pump and place, and therefore difficult to use as a post tensioned grout.

When the copolymer was added to the cementitious composition, the water loss was reduced to zero without a concurrent rise in viscosity, allowing the grout to be easily pumped for application. Increased bleeding resistance was observed even with low doses of the copolymer as sample 5 demonstrates, wherein the mixture contained only 0.1% copolymer, yet only lost 1 cc (0.06 cubic inches) of water as compared to example 2 where 7.4 cc's (0.45 cubic inches) of water were lost. No bleeding was observed even with an increase in time and pressure, as demonstrated in samples 7, 8 and 9, which were subjected to 100 psi (689.4 kilopascals) for increasing periods of time, namely 5, 10 and 20 minutes, with no water loss.

It should be appreciated that the specific embodiments described above include variations, modifications and equivalent embodiments defined by the following claims. The embodiments disclosed are not necessarily in the alternative, as various embodiments of the invention may be combined to provide desired characteristics or results.

I claim:

1. A method of making a reduced fluid loss post-tensioned hydraulic cementitious grout article comprising:
   inserting at least one bar member into a channel; securing a first end of the bar member; stretching the bar member; securing a second end of the bar member; introducing into the channel a reduced fluid loss hydraulic cementitious grout composition comprising hydraulic cement, water, and a copolymer, wherein the copolymer comprises at least two components selected from a), b) and c):

wherein a) is the component

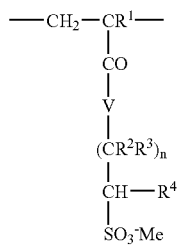 (Formula I)

wherein
R$^1$=is at least one of hydrogen or methyl;
R$^2$, R$^3$, R$^4$=are each independently hydrogen, aliphatic hydrocarbon radical with 1 to about 6 carbon atoms, or phenyl radical;
V=NH or oxygen;
M=hydrogen, monovalent metal cation, bivalent metal cation, ammonium, or an organic amino radical;
n=about 1 to about 5;
e=0.5 or 1;
b) is at least one component selected from the group consisting of

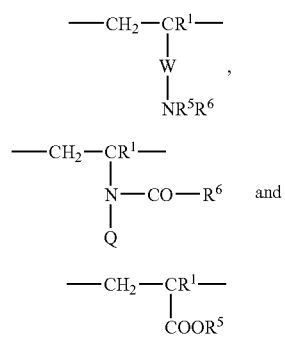

(Formula II)

(Formula III) and (Formula IV)

wherein
W=—CO—, —CO—(CH$_2$)$_x$—, —CO—NR$^2$—(CH$_2$)$_x$—;
R$^1$=is at least one of hydrogen or methyl;
R$^2$=hydrogen, aliphatic hydrocarbon radical with 1 to about 6 carbon-atoms, or phenyl radical;
x=about 1 to about 6;
R$^5$ and R$^6$=are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;
Q=hydrogen or —CHR$^5$R$^7$;
R$^7$=hydrogen, aliphatic hydrocarbon radical containing 1 to about 4 carbon atoms, —COOH or —COOM$_a$;
M=hydrogen, monovalent metal cation, bivalent metal cation, ammonium, or an organic amino radical;
a=0.5 or 1;
c) is at least one component selected from the group consisting of

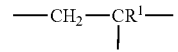 (Formula V)

and

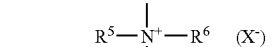 (Formula VI)

wherein
R$^1$=is at least one of hydrogen or methyl;
R$^2$ and R$^3$=are each independently hydrogen, aliphatic hydrocarbon radical with 1 to about 6 carbon-atoms, or phenyl radical;
R$^5$ and R$^6$=are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;
R$^8$=R$^5$ or R$^6$, —(CH$_2$)$_x$—SO$_3^\ominus$(M),

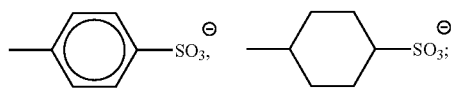

Y=O, NH or NR$^5$;
V=—(CH$_2$)$_x$—,

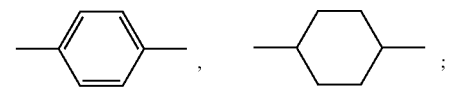

X=halogen, C$_1$- to C$_4$-alkylsulfate or C$_1$- to C$_4$-alkylsulfonate; and
M=hydrogen, monovalent metal cation, bivalent metal cation, ammonium, or an organic amino radical.

2. A reduced fluid loss post-tensioned hydraulic cementitious grout article produced by the method of claim 1.

3. The reduced fluid loss post-tensioned hydraulic cementitious grout article of claim 2, wherein the reduced fluid loss post-tensioned hydraulic cementitious grout article is a reduced fluid loss post-tensioned tendon.

4. A concrete member comprising the reduced fluid loss post-tensioned hydraulic cementitious grout article of claim 2.

5. The method of claim 1, wherein the bar member is at least one of bars, rods, strands, or cables.

6. The method of claim 1, wherein if R$^5$ or R$^6$ is an aliphatic hydrocarbon radical at least one aliphatic hydrocarbon radical of the copolymer comprises a substituent that is at least one of a hydroxyl group, alkyl group containing 1 to about 6 carbon atoms, carboxyl group or sulfonic group.

7. The method of claim 1, wherein if $R^5$ or $R^6$ is an alicyclic hydrocarbon radical at least one alicyclic hydrocarbon radical of the copolymer comprises a substituent that is at least one of a hydroxyl group, alkyl group containing 1 to about 6 carbon atoms, carboxyl group or sulfonic group.

8. The method of claim 1, wherein if $R^5$ or $R^6$ is an aryl radical at least one aryl radical of the copolymer comprises a substituent that is at least one of a hydroxyl group, alkyl group containing 1 to about 6 carbon atoms, carboxyl group or sulfonic group.

9. The method of claim 1, wherein if $R^2$, $R^3$, or $R^4$ is a phenyl radical at least one phenyl radical of the copolymer comprises a substituent that is at least one of a hydroxyl group, alkyl group containing 1 to about 6 carbon atoms, carboxyl group or sulfonic group.

10. The method of claim 1, wherein if M is an organic amino radical at least one organic amino radical of the copolymer comprises a substituent that is at least one of a hydroxyl group, alkyl group containing 1 to about 6 carbon atoms, carboxyl group or sulfonic group.

11. The method of claim 1, wherein if M is an organic amino radical at least one organic amino radical of the copolymer comprises substituted ammonium groups derived from the group consisting of primary, secondary or tertiary $C_1$ to $C_{20}$ alkylamines; primary, secondary or tertiary $C_1$ to $C_{20}$ alkanolamines; primary, secondary or tertiary $C_5$ to $C_8$ cycloalkylamines; and, primary, secondary or tertiary $C_6$ to $C_{14}$ arylamines.

12. The method of claim 1, wherein if M is a monovalent metal cation the monovalent metal cation is at least one of sodium, lithium, or potassium ions.

13. The method of claim 1, wherein if M is a bivalent metal cation the bivalent metal cation is at least one of calcium or magnesium ions.

14. The method of claim 1, wherein X is an anion of at least one of chlorine, bromine, sulfate or methyl sulfate.

15. The method of claim 1, wherein the sulfonic acid of formula I is replaced with at least one of methallylsulfonic acid or allyl sulfonic acid.

16. The method of claim 1, wherein the copolymer includes at least one of N,N, dimethylacrylamide and 2-acrylamido, 2-methyl propane sulfonic acid.

17. The method of claim 1 wherein the copolymer comprises a d) component that is at least one compound selected from the group consisting of diacrylate ester of ethylene glycol, dimethylacrylate ester of ethylene glycol, polypropylene glycol, block copolymers of ethylene glycol, block copolymers of propylene glycol, diallyl ether of ethylene glycol, diallyl ether of propylene glycol, divinyl ether of ethylene glycol, divinyl ether of propylene glycol, 1,4-butanediol, 1,5-pentanediol, 1,6-hexanediol, N,N'-methylene-bis-acrylamide, N,N'-methylene-bis-methacrylamide, trimethylolpropane, triacrylate, triallyl isocyanurate, and mixtures thereof.

18. The method of claim 17 wherein the copolymer comprises about 0.0001 mole percent to about 50 mole percent of the d) component.

19. The method of claim 17 wherein the copolymer comprises about 0.001 mole percent to about 5 mole percent of the d) component.

20. The method of claim 1 wherein the copolymer comprises a d) component that is at least one compound selected from the group consisting of acrylonitrile, styrene, ethylene, butadiene, propylene, isobutene, vinyl acetate, acrylic acid, methacrylic acid, methyl acrylate, methyl methacrylate, ethyl acrylate, butyl acrylate, ethylhexyl acrylate, allyl acetate, maleic acid, maleic anhydride, diethyl maleate, dibutyl maleate, fumaric acid, itaconic acid, dodecenylsuccinic anhydride, vinylsulfonic acid, styrene sulfonic acid and mixtures thereof.

21. The method of claim 20 wherein the copolymer comprises about 0.1 mole percent to about 30 mole percent of the d) component.

22. The method of claim 1, wherein the copolymer has an average molecular weight of about 50,000 g/mol to about 20,000,000 g/mol.

23. The method of claim 1, wherein the copolymer comprises about 3 to about 96 mole percent of component a), about 3 to about 96 mole percent of component b) and 0 to about 75 mole percent of component c).

24. The method of claim 1, wherein the copolymer comprises about 40 to about 80 mole percent component a), about 10 to about 55 mole percent component b) and about 2 to about 30 mole percent component c).

25. The method of claim 1, wherein the hydraulic cement is selected from the group consisting of portland cement, masonry cement, alumina cement, refractory cement, magnesia cement, calcium sulfoaluminate cement, and mixtures thereof.

26. The method of claim 1 further comprising at least one of set accelerators, set retarders, air-entraining agents, defoamers, corrosion inhibitors, strength enhancing agents, fibers, dampproofing admixtures, expansive agents, permeability reducers, pumping aids, fungicidal admixtures, germicidal admixtures, insecticidal admixtures, shrinkage reducing admixtures, aggregates, pozzolans, water retention agents, viscosifying agents, and mixtures thereof.

27. The method of claim 26 wherein if present, the pozzolan is one of silica fume, reactive silica, granulated ground blast furnace slag, fly ash, calcined clay, and mixtures thereof.

28. The method of claim 26 wherein if present the set accelerator comprises at least one of:
   a) a nitrate salt of an alkali metal, alkaline earth metal, or aluminum;
   b) a nitrite salt of an alkali metal, alkaline earth metal, or aluminum;
   c) a thiocyanate of an alkali metal, alkaline earth metal or aluminum;
   d) an alkanolamine;
   e) a thiosulphate of an alkali metal, alkaline earth metal, or aluminum;
   f) a hydroxide of an alkali metal, alkaline earth metal, or aluminum;
   g) a carboxylic acid salt of an alkali metal, alkaline earth metal, or aluminum;
   h) a polyhydroxylalkylamine; or
   i) a halide salt of an alkali metal or alkaline earth metal.

29. The method of claim 26 wherein if present the set retarder is selected from the group consisting of an oxyboron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates, petroleum oil mixtures, and mixtures thereof.

30. The method of claim 1 wherein the water to cement ratio is no greater than about 0.45.

31. The method of claim 1 wherein the water to cement ratio is about 0.35 to about 0.44.

32. The method of claim 1 wherein the copolymer is present in an amount from about 0.001% to about 10.0% based on the dry weight of the hydraulic cement.

33. The method of claim 16 wherein the copolymer of N,N, dimethylacrylamide and 2-acrylamido, 2-methyl propane sulfonic acid is present in an amount from about 0.001% to about 10.0% based on the dry weight of the hydraulic cement.

34. A method of making a reduced fluid loss post-tensioned hydraulic cementitious grout article comprising:
  inserting at least one bar member into a channel; securing a first end of the bar member; stretching the bar member; securing a second end of the bar member; introducing into the channel a reduced fluid loss hydraulic cementitious grout composition comprising hydraulic cement, water, and a copolymer, wherein the copolymer comprises at least two components selected from a), b) and c):
wherein a) is the component

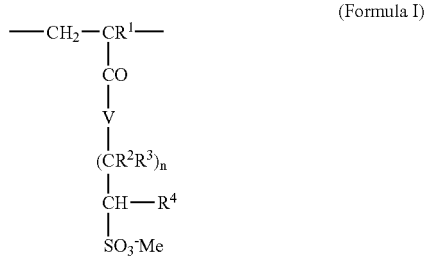
(Formula I)

wherein
  $R^1$=is at least one of hydrogen or methyl;
  $R^2$, $R^3$, $R^4$=are each independently hydrogen, aliphatic hydrocarbon radical with 1 to about 6 carbon atoms, or phenyl radical;
  V=NH or oxygen;
  M=hydrogen, monovalent metal cation, bivalent metal cation, ammonium, or an organic amino radical;
  n=about 1 to about 5;
  e=0.5 or 1;

b) is the component

(Formula II)
wherein
  W=CO—, —CO—$(CH_2)_x$—, —CO—$NR^2$—$(CH2)_x$—;
  $R^1$=is at least one of hydrogen or methyl;
  $R^2$=hydrogen, aliphatic hydrocarbon radical with 1 to about 6 carbon-atoms, or phenyl radical;
  x=about 1 to about 6;
  $R^5$ and $R^6$=are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;

c) is the component

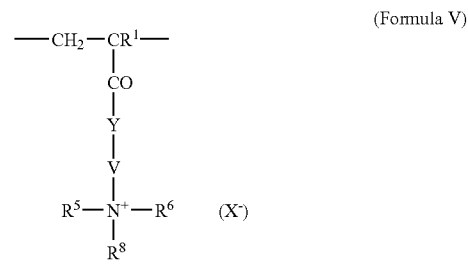
(Formula V)

wherein
  $R^1$=is at least one of hydrogen or methyl;
  $R^5$ and $R^6$=are each independently hydrogen, alkyl group containing 1 to about 4 carbon atoms, aliphatic hydrocarbon radical containing 1 to about 20 carbon atoms, alicyclic hydrocarbon radical containing about 5 to about 8 carbon atoms, or aryl radical containing about 6 to about 14 carbon atoms;
  $R^8$=$R^5$ or $R^6$, —$(CH_2)_x$—$SO_3^\ominus$(M),

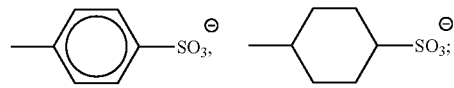

Y=O, NH or $NR^5$;
V=—$(CH_2)_x$—,

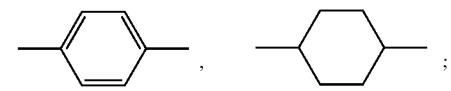

X=halogen, $C_1$- to $C_4$-alkylsulfate or $C_1$- to $C_4$-alkylsulfonate; and
M=hydrogen, monovalent metal cation, bivalent metal cation, ammonium, or an organic amino radical.

35. A reduced fluid loss post-tensioned hydraulic cementitious grout article produced by the method of claim 34.

36. The reduced fluid loss post-tensioned hydraulic cementitious grout article of claim 35, wherein the reduced fluid loss post-tensioned hydraulic cementitious grout article is a reduced fluid loss post-tensioned tendon.

37. A concrete member comprising the reduced fluid loss post-tensioned hydraulic cementitious grout article of claim 35.

38. The method of claim 34, wherein the bar member is at least one of bars, rods, strands, or cables.

39. The method of claim 34, wherein if $R^5$ or $R^6$ is an aliphatic hydrocarbon radical at least one aliphatic hydrocarbon radical of the copolymer comprises a substituent that is at least one of a hydroxyl group, alkyl group containing 1 to about 6 carbon atoms, carboxyl group or sulfonic group.

40. The method of claim 34, wherein if $R^5$ or $R^6$ is an alicyclic hydrocarbon radical at least one alicyclic hydrocarbon radical of the copolymer comprises a substituent that is at least one of a hydroxyl group, alkyl group containing 1 to about 6 carbon atoms, carboxyl group or sulfonic group.

41. The method of claim 34, wherein if $R^5$ or $R^6$ is an aryl radical at least one aryl radical of the copolymer comprises a substituent that is at least one of a hydroxyl group, alkyl group containing 1 to about 6 carbon atoms, carboxyl group or sulfonic group.

42. The method of claim 34, wherein if $R^2$, $R^3$, or $R^4$ is a phenyl radical at least one phenyl radical of the copolymer comprises a substituent that is at least one of a hydroxyl group, alkyl group containing 1 to about 6 carbon atoms, carboxyl group or sulfonic group.

43. The method of claim 34, wherein if M is an organic amino radical at least one organic amino radical of the copolymer comprises a substituent that is at least one of a hydroxyl group, alkyl group containing 1 to about 6 carbon atoms, carboxyl group or sulfonic group.

44. The method of claim 34, wherein if M is an organic amino radical at least one organic amino radical of the copolymer comprises substituted ammonium groups derived from the group consisting of primary, secondary or tertiary $C_1$ to $C_{20}$ alkylamines; primary, secondary or tertiary $C_1$ to $C_{20}$ alkanolamines; primary, secondary or tertiary $C_5$ to $C_8$ cycloalkylamines; and, primary, secondary or tertiary $C_6$ to $C_{14}$ arylamines.

45. The method of claim 34, wherein if M is a monovalent metal cation the monovalent metal cation is at least one of sodium, lithium, or potassium ions.

46. The method of claim 34, wherein if M is a bivalent metal cation the bivalent metal cation is at least one of calcium, or magnesium ions.

47. The method of claim 34, wherein X is an anion of at least one of chlorine, bromine, sulfate or methyl sulfate.

48. The method of claim 34 wherein the sulfonic acid of formula I is replaced with at least one of methallylsulfonic acid or allyl sulfonic acid.

49. The method of claim 34, wherein the copolymer includes at least one of N,N, dimethylacrylamide and 2-acrylamido, 2-methyl propane sulfonic acid.

50. The method of claim 34 wherein the copolymer comprises a d) component that is at least one compound selected from the group consisting of diacrylate ester of ethylene glycol, dimethylacrylate ester of ethylene glycol, polypropylene glycol, block copolymers of ethylene glycol, block copolymers of propylene glycol, diallyl ether of ethylene glycol, diallyl ether of propylene glycol, divinyl ether of ethylene glycol, divinyl ether of propylene glycol, 1,4-butanediol, 1,5-pentanediol, 1,6-hexanediol, N,N'-methylene-bis-acrylamide, N,N'-methylene-bis-methacrylamide, trimethylolpropane, triacrylate, triallyl isocyanurate, and mixtures thereof.

51. The method of claim 50 wherein the copolymer comprises about 0.0001 mole percent to about 50 mole percent of the d) component.

52. The method of claim 50 wherein the copolymer comprises about 0.001 mole percent to about 5 mole percent of the d) component.

53. The method of claim 34 wherein the copolymer comprises a d) component that is at least one compound selected from the group consisting of acrylonitrile, styrene, ethylene, butadiene, propylene, isobutene, vinyl acetate, acrylic acid, methacrylic acid, methyl acrylate, methyl methacrylate, ethyl acrylate, butyl acrylate, ethylhexyl acrylate, allyl acetate, maleic acid, maleic anhydride, diethyl maleate, dibutyl maleate, fumaric acid, itaconic acid, dodecenylsuccinic anhydride, vinylsulfonic acid, styrene sulfonic acid and mixtures thereof.

54. The method of claim 53 wherein the copolymer comprises about 0.1 mole percent to about 30 mole percent of the d) component.

55. The method of claim 34, wherein the copolymer has an average molecular weight of about 50,000 g/mol to about 20,000,000 g/mol.

56. The method of claim 34, wherein the copolymer comprises about 3 to about 96 mole percent of component a), about 3 to about 96 mole percent of component b) and 0 to about 75 mole percent of component c).

57. The method of claim 34, wherein the copolymer comprises about 40 to about 80 mole percent component a), about 10 to about 55 mole percent component b) and about 2 to about 30 mole percent component c).

58. The method of claim 34, wherein the hydraulic cement is selected from the group consisting of portland cement, masonry cement, alumina cement, refractory cement, magnesia cement, calcium sulfoaluminate cement, and mixtures thereof.

59. The method of claim 34 further comprising at least one of set accelerators, set retarders, air-entraining agents, defoamers, corrosion inhibitors, strength enhancing agents, fibers, dampproofing admixtures, expansive agents, permeability reducers, pumping aids, fungicidal admixtures, germicidal admixtures, insecticidal admixtures, shrinkage reducing admixtures, aggregates, pozzolans, water retention agents, viscosifying agents, and mixtures thereof.

60. The method of claim 59 wherein if present, the pozzolan is one of silica fume, reactive silica, granulated blast furnace slag, fly ash, calcined clay, and mixtures thereof.

61. The method of claim 59 wherein if present the accelerator comprises at least one of:
  a) a nitrate salt of an alkali metal, alkaline earth metal, or aluminum;
  b) a nitrite salt of an alkali metal, alkaline earth metal, or aluminum;
  c) a thiocyanate of an alkali metal, alkaline earth metal or aluminum;
  d) an alkanolamine;
  e) a thiosulphate of an alkali metal, alkaline earth metal, or aluminum;
  f) a hydroxide of an alkali metal, alkaline earth metal, or aluminum;
  g) a carboxylic acid salt of an alkali metal, alkaline earth metal, or aluminum;
  h) a polyhydroxylalkylamine; or
  i) a halide salt of an alkali metal or alkaline earth metal.

62. The method of claim 59 wherein if present the retarder is selected from the group consisting of an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates, petroleum oil mixtures, and mixtures thereof.

63. The method of claim 34 wherein the water to cement ratio is no greater than about 0.45.

64. The method of claim 34 wherein the water to cement ratio is about 0.35 to about 0.44.

65. The method of claim 34 wherein the copolymer is present in an amount from about 0.001% to about 10.0% based on the dry weight of the hydraulic cement.

66. The method of claim 49 wherein the copolymer of N,N, dimethylacrylamide and 2-acrylamido, 2-methyl propane sulfonic acid is present in an amount from about 0.001% to about 10.0% based on the dry weight of the hydraulic cement.

* * * * *